United States Patent
Frazier et al.

(10) Patent No.: US 7,392,206 B1
(45) Date of Patent: Jun. 24, 2008

(54) CUSTOMER SATISFACTION THROUGH CUSTOMER IDENTIFICATION AND SERVICE-TIME MEASUREMENT

(75) Inventors: John D. Frazier, Ramona, CA (US); Michael L. Reed, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 1164 days.

(21) Appl. No.: 09/943,708

(22) Filed: Aug. 31, 2001

(51) Int. Cl.
*G06Q 30/00* (2006.01)

(52) U.S. Cl. .......................................... 705/26; 705/37
(58) Field of Classification Search ................... 705/26, 705/14, 27, 15, 16, 37; 707/1–6, 104; 701/117; 706/26
See application file for complete search history.

(56) References Cited

U.S. PATENT DOCUMENTS

| | | | | |
|---|---|---|---|---|
| 6,374,240 B1 * | 4/2002 | Walker et al. | ................... | 707/5 |
| 6,480,713 B2 * | 11/2002 | Jenkins | ................... | 455/412.1 |
| 6,574,603 B1 * | 6/2003 | Dickson et al. | ................. | 705/1 |
| 6,587,835 B1 * | 7/2003 | Treyz et al. | ................... | 705/14 |

OTHER PUBLICATIONS

"Identifying the information requirements to deliver service," Berkley, Blair J, Gupta, Amit. International Journal of Service Industry Management. Bradford: 1995. vol. 6, Iss. 5; p. 16, 20 pgs, downloaded for ProQuest on the Internet on Jan. 21, 2008.*

* cited by examiner

*Primary Examiner*—James Zurita
(74) *Attorney, Agent, or Firm*—John Cowart (57) ABSTRACT

A service establishment, such as a fast-food restaurant or a bank, improves customer satisfaction by monitoring the quality of service received by the customer and compensating the customer with a personalized offer of compensation when service is inadequate. When the customer visits the service establishment, the service establishment detects the customer's presence by acquiring a signal from a device, such as an RF transponder, carried by the customer. The establishment uses information contained in this signal to identify the customer and to retrieve archived information about previous interactions with the customer. The establishment then analyzes the archived information to identify a product or service of interest to the customer and, before the customer leaves the service establishment, to offer the product or service to the customer.

25 Claims, 7 Drawing Sheets

CUSTOMER SATISFACTION THROUGH CUSTOMER IDENTIFICATION AND SERVICE-TIME MEASUREMENT

BACKGROUND

In many industries, such as the fast-food industry in the United States, a disproportionately large share of revenues flow from relatively small groups of loyal, repeat customers. For the American fast-food industry, these customers tend to prefer speedy drive-thru service to more time-consuming, in-store meals. As a result, drive-thru customers now account for more than half of all revenues in the fast-food industry.

Because drive-thru revenues are so great, American fast-food establishments have begun seeking ways to process drive-thru orders more quickly and reduce waiting times for drive-thru customers. Some establishments use electronic timers to measure a customer's wait at the drive-thru window. If the customer waits "too long," the customer receives some form of compensation, such as a coupon for free food, to encourage a return visit. Timing usually begins when the customer places an order or reaches the drive-thru window and does not account for time the customer might have waited in line up to that point. Also, the coupons offered as compensation are typically the same for all customers, regardless of whether a particular customer has any interest in the item offered.

SUMMARY

Described below is a technique for use by a service establishment in providing higher quality customer service. When a customer visits the service establishment, the service establishment detects the customer's presence by acquiring a signal from a device, such as an RF transponder, carried by the customer. The establishment uses information contained in this signal to identify the customer and to retrieve archived information about previous interactions with the customer. The establishment then analyzes the archived information to identify a product or service of interest to the customer and, before the customer leaves the service establishment, to offer the product or service to the customer.

Another technique allows the service establishment to improve customer service by measuring the amount of time a customer spends waiting in line, e.g., in a drive-thru service lane or at a service counter. The service establishment receives a signal from a device carried by the customer, such as an RF transponder on the customer's automobile or in the customer's pocket, when the customer reaches a first checkpoint in the service line. Upon receiving this signal, the service establishment initiates a time-monitoring sequence. When the customer reaches a second checkpoint in the service line, the service establishment receives another signal from the device and, in response, ends the time-monitoring sequence. Measuring the customer's wait-time in this manner allows the service establishment to compensate the customer for long waits or to reward employees for keeping wait-times down.

Also described is a computer network for use in providing services to customers of a group of service establishments, such as a chain of fast-food restaurants or grocery stores. Each of the service establishments includes a local computer system that is configured to collect at least two types of information: (a) information identifying customers of the service establishment; and (b) information about transactions between the service establishment and those customers. When a customer visits one of the service establishments, the local computer system also receives information identifying that customer, assesses whether the customer is receiving adequate service, and, if the customer is not receiving adequate service, assists in delivering an offer to compensate the customer for the inadequate service.

The network also includes a data-warehouse system that receives at least two types of information from the local computer systems: (a) information about the products and services purchased by customers; and (b) information identifying those customers. When a customer visits one of the service establishments, the local computer system sends the information identifying that customer to the data warehouse. In response, the data warehouse sends the service establishment information about the products or services previously purchased by that customer. The service establishment then uses this information in delivering its offer to compensate the customer for inadequate service.

Other features and advantages will become apparent from the description and claims that follow.

DETAILED DESCRIPTION

Recent advances in technology give service providers, such as fast-food establishments, the tools needed to identify individual customers and measure the speed of service each customer receives. The service providers also are able to monitor each customer's purchasing habits and, upon providing less than adequate service, compensate the customer with free or discounted services or products that appeal to that customer.

Figure 1:
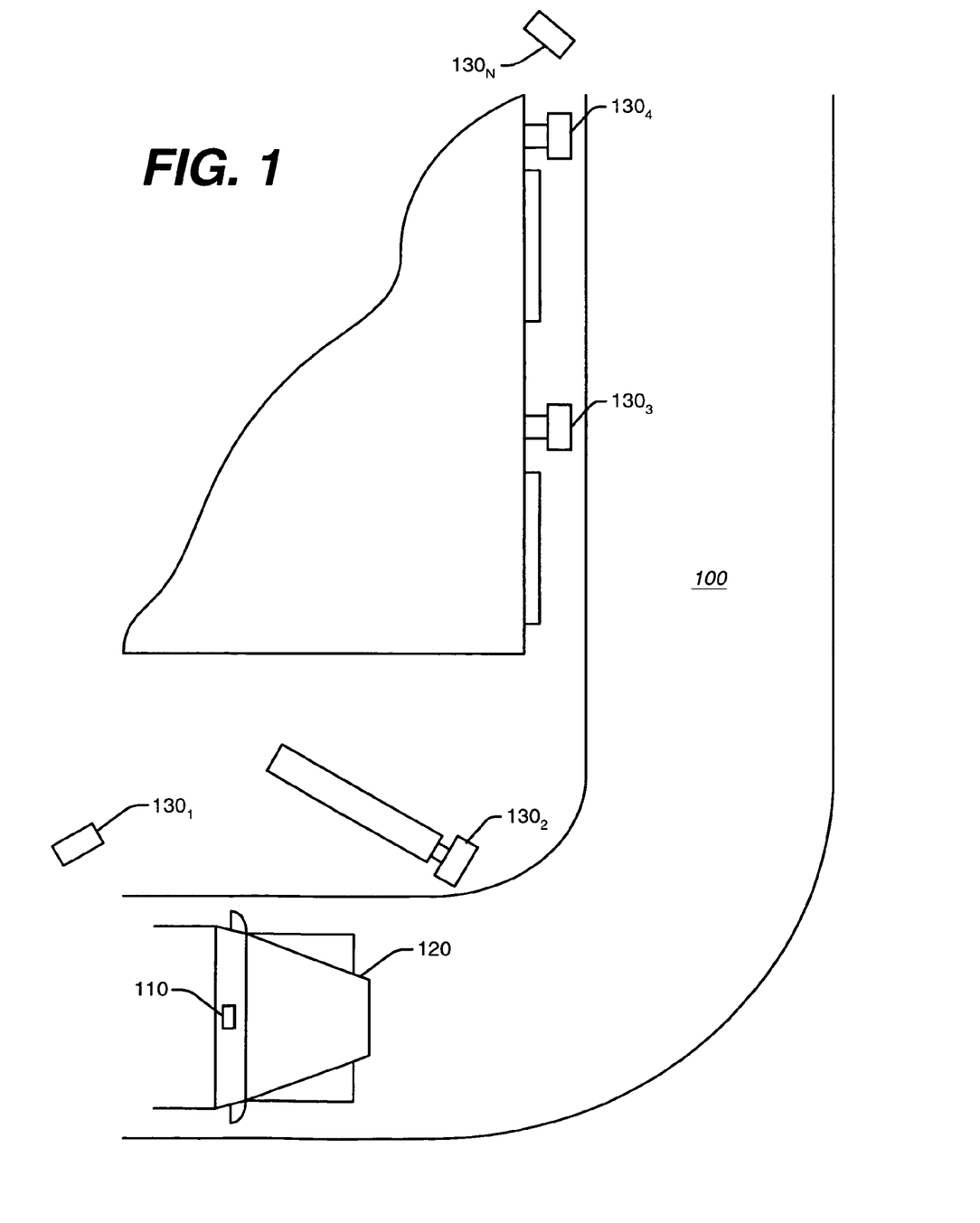
FIG. 1 is a partial view of a drive-thru lane at a service establishment.

FIG. 1 shows a service establishment equipped to identify an individual customer and to monitor the speed-of-service that the customer receives. In this example, the service establishment provides a drive-thru service lane 100 that is equipped to recognize a transponder 110 in the customer's automobile 120 and thus to allow more personalized service to that customer.

The drive-thru lane 100 includes one or more detectors $130_{1-N}$ that interact with the transponder 110 and, in doing so, allow the service establishment to identify the customer associated with the transponder. Detector systems such as this are used today in a wide variety of applications, such as in automated toll-collection on automotive thoroughfares and in automated fee-collection in self-service fueling stations. A wide variety of active and passive transponder devices are suited for use in service establishments like that described here.

Placing multiple detectors along the drive-thru service lane 100 allows the establishment to monitor the customer's progress through the lane. Placing an initial detector $130_1$ where the drive-thru lane begins or even in the parking lot allows the establishment to detect the customer's presence even when a line has formed in the drive-thru lane. At a fast-food establishment, placing a detector $130_2$ at the point where customers place their orders and placing additional detectors $130_3$, $130_4$ at each service window allows measurement of the wait time between consecutive points-of-contact with the customer.

Figure 2:
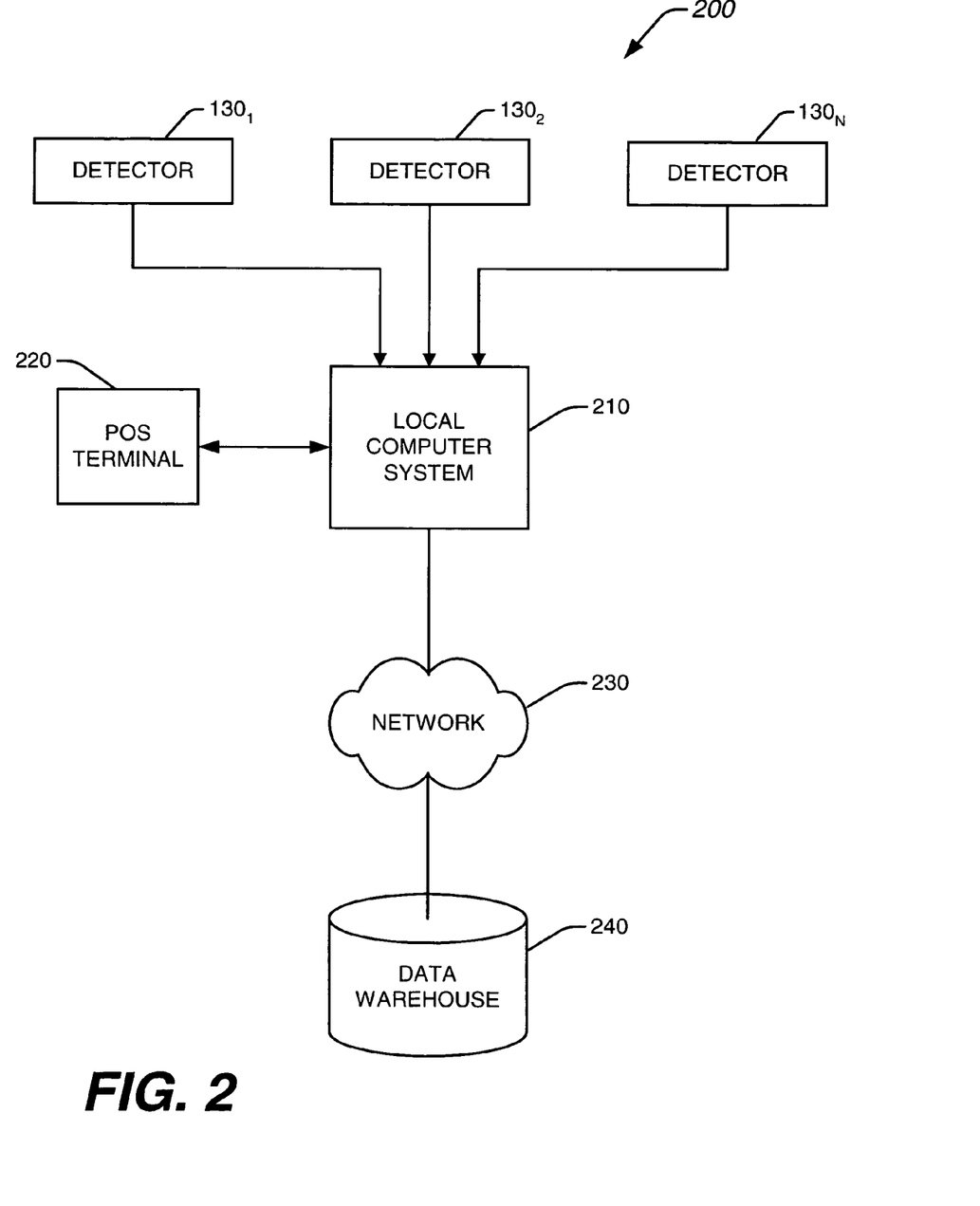
FIG. 2 is a schematic diagram of a network used to monitor customer service-times at a service establishment.

FIG. 2 shows a system 200 suited for use in identifying customers and monitoring service times. Each of the detectors $130_{1-N}$ in the drive-thru service lane (FIG. 1) connects to a local computer system 210 at the service establishment. When one of the detectors senses the presence of a customer's transponder, the detector acquires the transponder's identification number and generates a signal that initiates a timer or time-monitoring sequence in the computer system 210. The computer system measures the customer's waiting time between detectors by calculating the difference between the corresponding timer values.

The computer system 210 also connects to one or more point-of-sale (POS) terminals 220 in the service establishment. Employees of the service establishment provide service to each customer in the presence of and with assistance from the POS terminals. The POS terminals display traditional types of transaction information, such as the items purchased, the price paid for each item, and the total purchase price. The POS terminals are also equipped to display more customer-specific information, such as the customer's name or identification number, the customer's wait-time between points-of-contact, and a summary of the customer's purchase history or product and service preferences.

Displaying customer-specific information at the POS terminal allows the employees of the service establishment to make "on-the-spot" decisions about the quality of service given the customer and the type of compensation that might be in order when the customer receives "inadequate" service. For example, displaying a customer's total wait-time in the drive-thru lane allows the service employee to decide on-the-spot whether the customer should receive a coupon for a free or discounted food item. Likewise, displaying a summary of the customer's most frequently purchased items allows the employee to decide which coupon the customer should receive. Displaying other types of information, such as the profit margin associated with each of the customer's favorite items, empowers the employee to choose coupons that benefit both the customer and the service establishment.

In some embodiments, the POS terminal is equipped to assess automatically whether the customer is to receive compensation and what type of compensation is to be offered. In this case, the POS terminal applies a set of preprogrammed rules to the customer-specific information, such as the wait-time and product-preference information, and automatically generates the offer of compensation, if any, to be given to the customer.

The local computer system 210 also connects, either directly or through a network connection 230, to a data-warehouse system 240 that stores vast amounts of customer-specific data. The data-warehouse system 240 may be maintained locally at the service establishment or remotely at a central location that also serves other such establishments. Upon detecting a customer's transponder, the local computer system 210 delivers the transponder identification number to the data-warehouse system 240. The data-warehouse system in turn matches the transponder identification number to the customer and delivers the corresponding customer-specific information to the local computer system. In some systems, the local computer system in turn delivers this information (or some portion of this information) to the POS terminal. A wide variety of commercially available data-warehouse systems are suited for use in this type of environment, particularly the Teradata data-warehouse system available from NCR Corporation, as described below.

Figure 3:
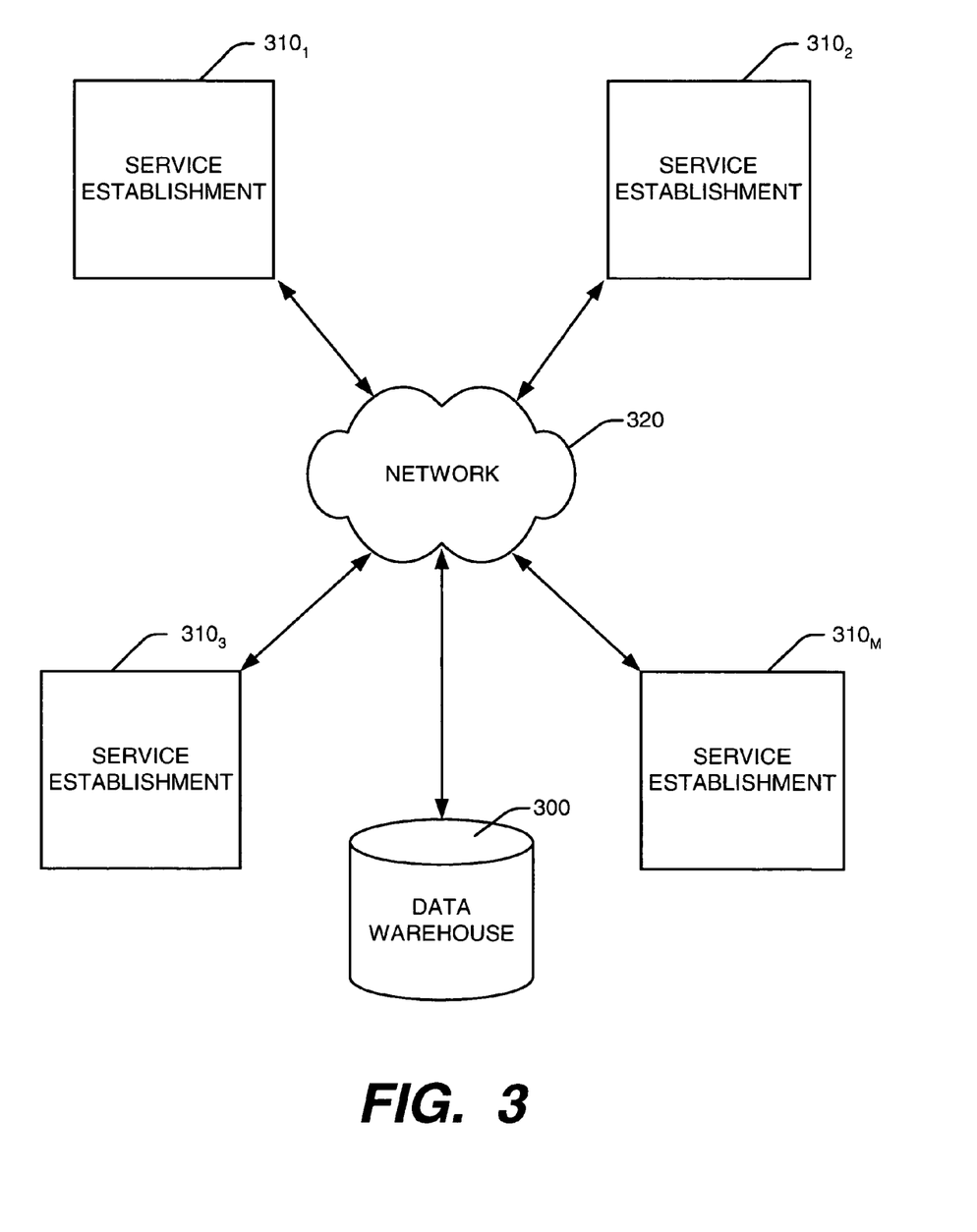
FIG. 3 is a schematic diagram of a network in which several service establishments are connected to a central data warehouse.
Figure 4:
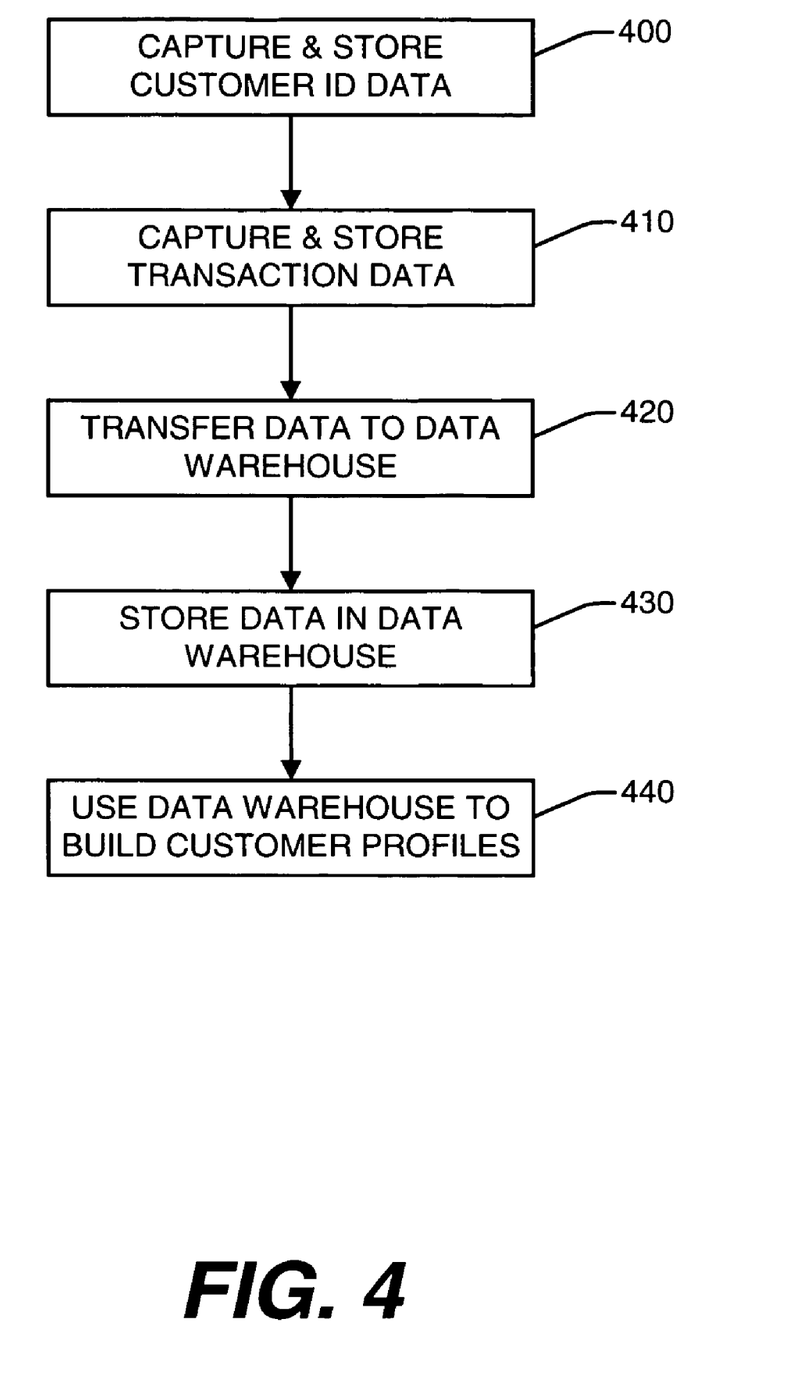
FIG. 4 is a flow diagram of a technique for use in capturing and storing information about customer transactions at multiple service establishments.

FIGS. 3 and 4 illustrate a technique in which a centrally located data-warehouse system 300 is used to store large amounts of customer-specific transaction information for multiple service establishments $310_{1-M}$, such as the various branch stores of a fast-food service chain. Information captured at each of the service establishments is delivered to the data-warehouse system 300 over a network 320 for storage and, in some cases, manipulation and analysis.

In capturing the information, the service establishments capture individual identification data for each customer at each encounter (step 400). One technique for doing so is detecting a transponder carried by the customer and capturing the transponder's identification number. In the fast-food industry, for example, service establishments can equip themselves to identify the customer both in drive-thru service lanes and at in-store counters. Key-ring transponders, such as those commonly used at self-service fueling stations, are one type of device suited for use in identifying walk-up customers at service counters. Other techniques include capturing credit-card information and asking the customer for certain personal information, such as the customer's home phone number.

The service establishment also captures and stores information about each transaction with the customer (step 410). Transaction data often includes information such as the types and quantities of items purchased by the customer, the price paid for each item, the form of service delivery (e.g., drive-thru vs. walk-up), the time of day at which the transaction occurred, and the form of payment used by the customer.

The local store transfers the captured data, either in real-time as part of a subsequent batch transfer, to the data-warehouse system (step 420). The data-warehouse system stores the transferred data (step 430) and, in some cases, uses the data to build a profile of each customer or otherwise analyze important characteristics of the customer (step 440).

Figure 5:
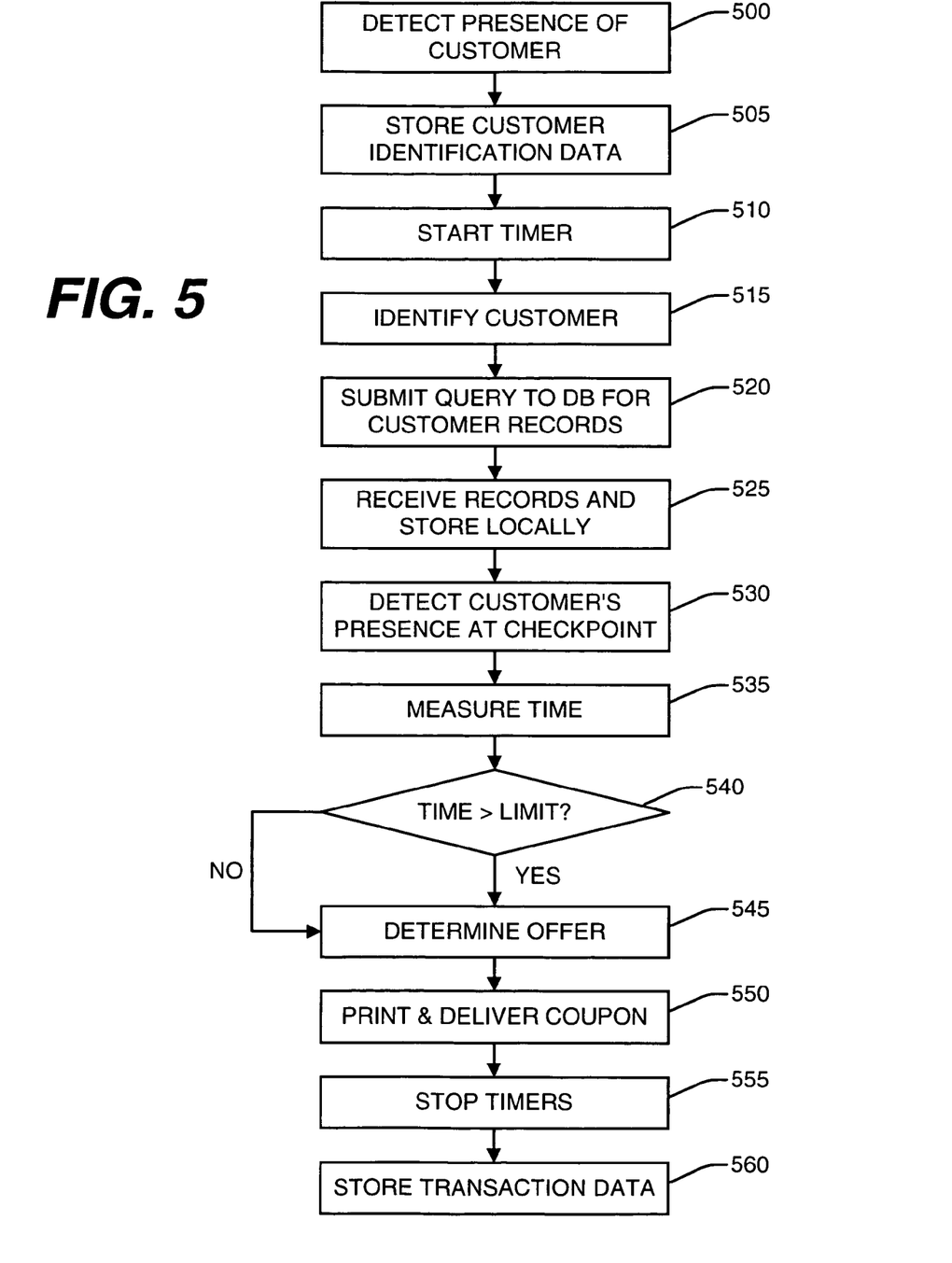
FIG. 5 is a flow diagram of a technique for use in monitoring a customer's service-time and compensating the customer if the service-time is substandard.

FIG. 5 shows an automated technique for use by a service establishment in recognizing a customer and monitoring the quality of service provided to that customer. When the customer enters the service establishment or its drive-thru service lane, the establishment detects and establishes the customer's presence (step 500). In establishing the customer's presence, the service establishment captures information that uniquely identifies the customer (e.g., a transponder's identification code or the customer's home telephone number) and stores this information in its computer or data-warehouse system (step 505). Capturing this information automatically initiates a timer or time-monitoring sequence in the computer system or in a POS terminal (step 510). The system also uses this information to identify the customer (e.g., by comparing the customer's transponder ID number to a list of such numbers stored in a look-up table) (step 515).

As the transaction with the customer takes place or as the customer progresses through the service lane, the local computer system at the service establishment submits one or more queries to the data-warehouse system in an effort to retrieve information about the customer (step 520). The types of information that the system might seek from the data warehouse include the customer's name (or the name(s) linked to the captured transponder ID number or home phone number) and a profile of the customer's purchasing habits. Upon receiving the requested information from the data warehouse, the local computer system stores the information for use during this transaction and, in some cases, for use in future transactions with this customer (step 525).

As described above, the service establishment often monitors the customer's progress through several points-of-contact, or "checkpoints," such as the point-of-entry, the order window, and the pick-up window of a drive-thru service lane (step 530). Upon detecting the customer's presence at a checkpoint, the system initiates a time-monitoring sequence that measures the customer's wait-time since the previous checkpoint (step 535), if any, and compares the measured wait-time to a predetermined threshold value to determine whether the customer's wait has been "too long" (step 540).

In some service establishments, the system stores more than one threshold value so that the service establishment can assess the degree of the customer's wait and adjust its offer of compensation accordingly. For example, a customer who experiences a wait that is five seconds longer than the "acceptable" wait might receive a coupon for a slight discount on a particular food item, while a customer who experiences a wait that is 30 seconds longer than the "acceptable" wait might receive a coupon for a free food item. The threshold values might also often vary from customer to customer. For example, a customer who visits the service establishment on a daily basis is likely to receive greater compensation for a 10-second "overwait" than a customer who visits only once per week.

Upon determining that a customer has waited "too long" and assessing the degree of the customer's "overwait," the system determines what type of compensation to offer the customer (step 545). In some cases this decision is made automatically by the computer system, and in other cases it is based on the judgment of an employee of the service establishment. In either case, the service establishment typically uses the information retrieved from the data warehouse in deciding what type of compensation to offer. A customer who purchases a particular type of food item on every visit, for example, might receive a coupon for a discounted or complimentary item of that type.

Upon deciding what type of compensation to offer the customer, many service establishments generate a printed version of the offer (e.g., a coupon) at the POS terminal (step 550). Alternatively, the service establishment keeps a supply of preprinted coupons, and an employee selects the coupon to be given to the customer.

When a customer's transaction is complete, the system stops all timers associated with that customer (step 555) and stores information about the transaction in a storage device (step 560). Techniques for notifying the system that the transaction is complete include (1) manually keying a "Transaction Complete" signal into the POS terminal and (2) detecting the transponder in the customer's automobile as the customer passes a final checkpoint in the drive-thru service lane.

Figure 6:
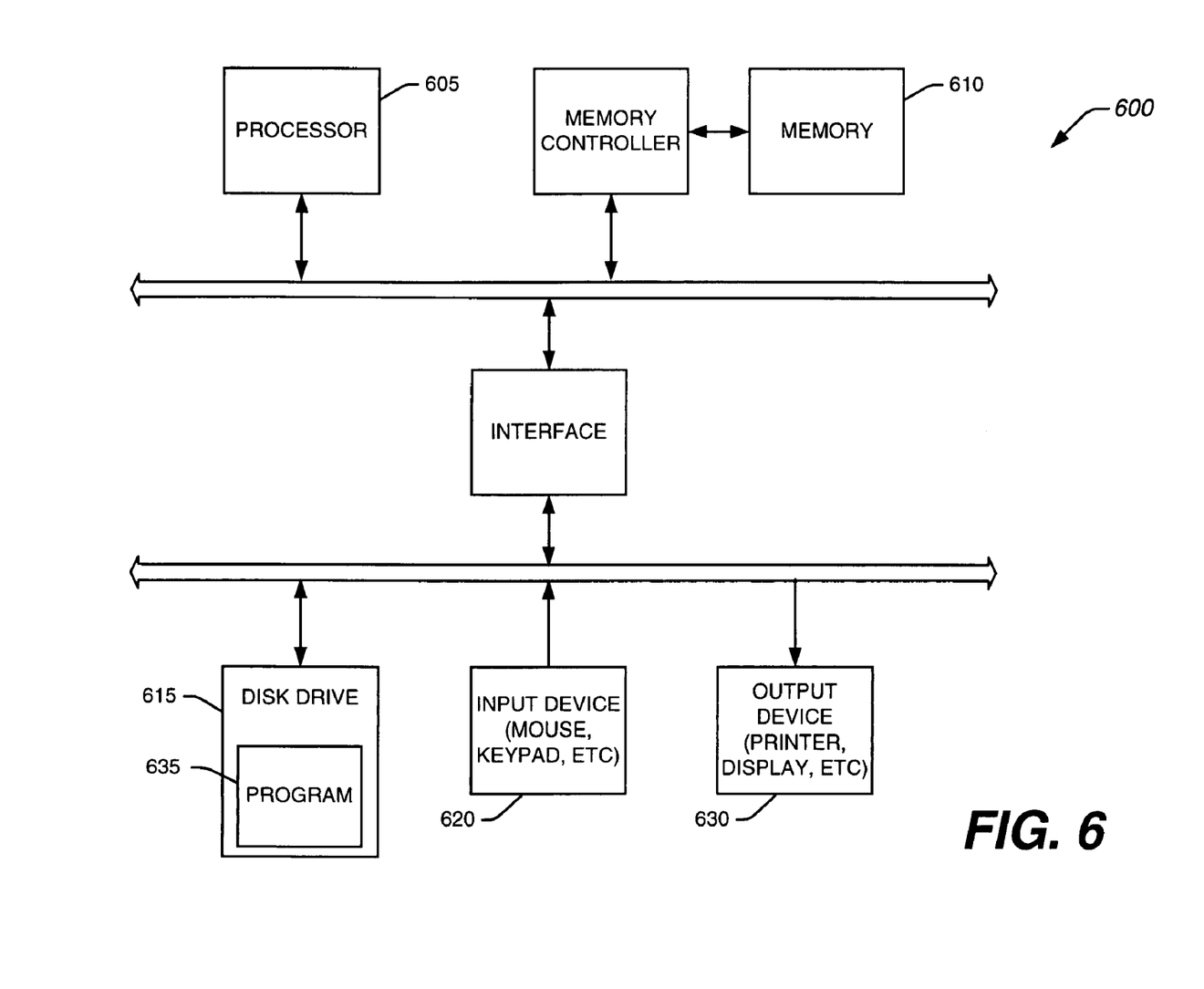
FIG. 6 is a schematic diagram of a computer system or point-of-sale terminal.

FIG. 6 shows a computer system 600 suited for use as the local computer system or as a POS terminal in the service establishment. In general, the computer 600 includes one or more processors 605, one or more temporary data-storage components 610 (e.g., volatile and nonvolatile memory modules), one or more persistent data-storage components 615 (e.g., optical and magnetic storage devices, such as hard and floppy disk drives, CD-ROM drives, and magnetic tape drives), one or more input devices 620 (e.g., mice, keyboards, and touch-screens), and one or more output devices 630 (e.g., display consoles and printers).

The computer 600 includes executable program code 635 that is usually stored in one of the persistent storage media 615 and then copied into memory 610 at run-time. The processor 605 executes the code by retrieving program instructions from memory in a prescribed order. When executing the program code, the computer receives data from the input and/or storage devices, performs operations on the data, and then delivers the resulting data to the output and/or storage devices.

In some embodiments, the computer is a special-purpose computer that performs only certain, specialized functions. In other embodiments, the computer is a general-purpose computer programmed to perform the functions needed by the service establishment.

Figure 7:
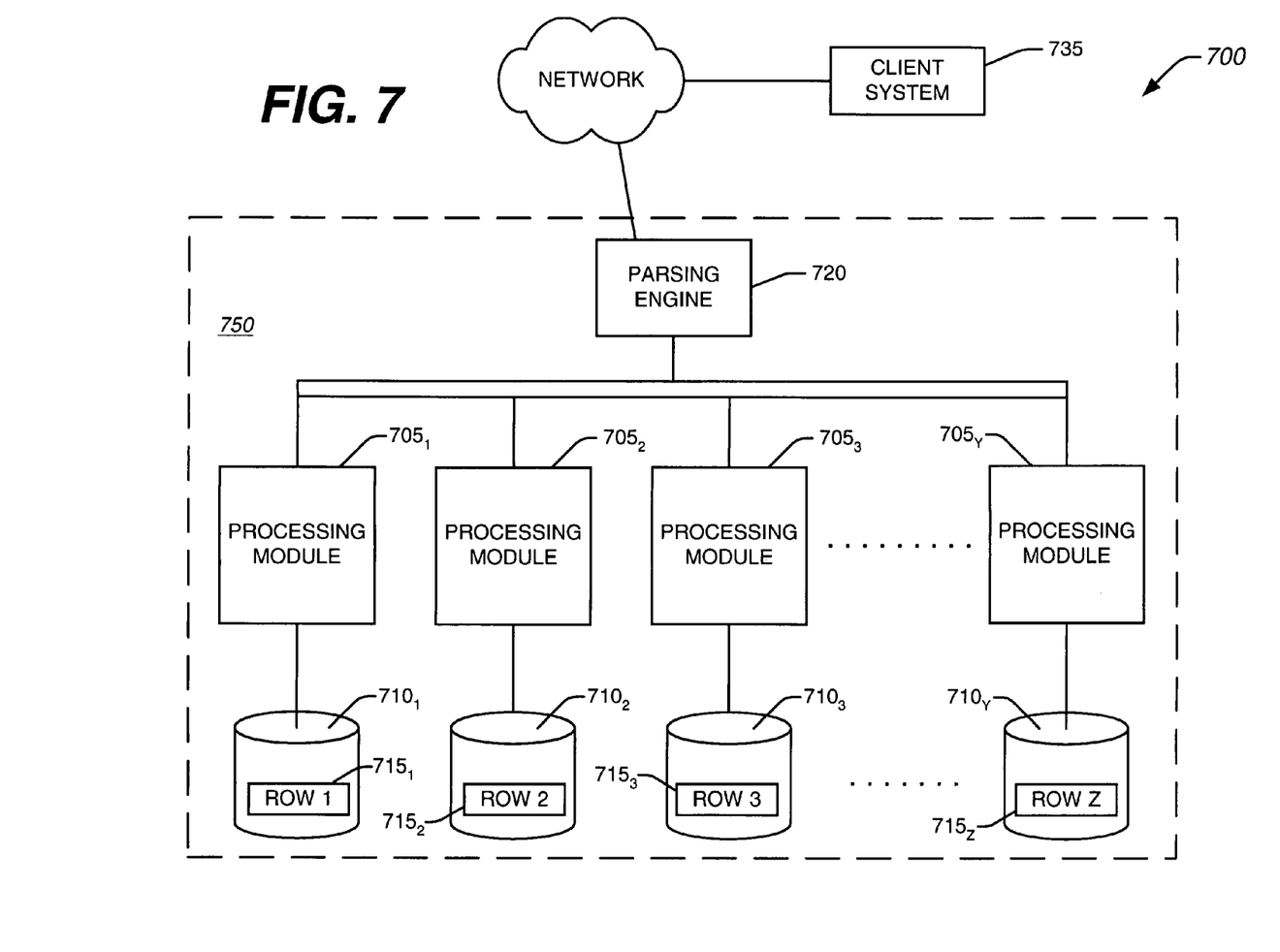
FIG. 7 is a schematic diagram of a data-warehouse system.

FIG. 7 shows a data-warehouse system 700 that is suited for use in providing the services described above. In this example, the data-warehouse 700 includes a relational database management system (RDBMS) built upon a massively parallel processing (MPP) platform. Other types of database systems, such as object-relational database management systems (ORDBMS) or those built on symmetric multi-processing (SMP) platforms, are also suited for use here.

The data warehouse 700 shown here includes one or more processing modules $705_{1 \ldots Y}$ that manage the storage and retrieval of data in data-storage facilities $710_{1 \ldots Y}$. Each of the processing modules $705_{1 \ldots Y}$ manages a portion of a database that is stored in a corresponding one of the data-storage facilities $710_{1 \ldots Y}$. Each of the data-storage facilities $710_{1 \ldots Y}$ includes one or more disk drives.

The system stores customer data and transaction data in one or more tables in the data-storage facilities $710_{1 \ldots Y}$. The rows $715_{1 \ldots Z}$ of the tables are stored across multiple data-storage facilities $710_{1 \ldots Y}$ to ensure that the system workload is distributed evenly across the processing modules $705_{1 \ldots Y}$. A parsing engine 720 organizes the storage of data and the distribution of table rows $715_{1 \ldots Z}$ among the processing modules $705_{1 \ldots Y}$. The parsing engine 720 also coordinates the retrieval of data from the data-storage facilities $710_{1 \ldots Y}$ in response to queries received from the local computer 735 at a service establishment. The data warehouse usually receives queries in a standard format, such as the Structured Query Language (SQL) put forth by the American National Standards Institute (ANSI).

The text above describes one or more specific embodiments of a broader invention. The invention also is carried out in a variety of alternative embodiments and thus is not limited to those described here. The customer-detection and service-monitoring techniques described here are suited for use in a wide variety of service establishments in which customers encounter lines, including grocery stores and banks. Detectors positioned along a grocery store service lane, for example, allow the store to recognize customers and monitor wait-times by detecting transponders on items such as key rings and smart cards carried by the customers. The techniques described here are also useful in implementing a system that promotes quality service, such as by rewarding service employees when customers receive speedy service. Many other embodiments are also within the scope of the following claims.

We claim:

1. A computer-automated method for use by a service establishment in providing services to a customer, the method comprising:

acquiring a signal from a device carried by the customer during a visit to the service establishment;

deriving from the signal information that allows identification of the customer; using this information to identify the customer and to retrieve archived information about previous interactions with the customer, analyzing the archived information to identify a product or service of interest to the customer;

assessing the quality-of-service received by the customer during the visit;

deciding that the quality-of-service received by the customer during the visit was below a quality-of-service threshold; and offering the identified product or service to the customer at a discount before the customer leaves the service establishment.

2. The method of claim 1, where assessing the quality-of-service received by the customer during the visit includes measuring the amount of time taken to serve the customer and comparing the measured amount to a threshold amount.

3. The method of claim 2, where the method also includes using the archived information about previous interactions with the customer in calculating the threshold amount.

4. The method of claim 1, where assessing the quality-of-service received by the customer includes measuring the amount of time that the customer waits in a service lane provided by the service establishment.

5. The method of claim 4, where measuring the amount of time that the customer waits in the service lane includes:

initiating a time-monitoring sequence upon acquiring the signal from the device; and completing the time-monitoring sequence when the customer reaches a checkpoint in the service lane.

6. The method of claim 4, where measuring the amount of time that the customer waits in the service lane includes:

acquiring a signal from the device when customer reaches a first checkpoint; and acquiring another signal from the device when the customer reaches a second checkpoint.

7. The method of claim 4, where measuring the amount of time that the customer waits in the service lane includes measuring the customer's waiting-time in a drive-thru service lane provided by the service establishment.

8. The method of claim 7, where acquiring a signal from a device carried by the customer includes acquiring a signal from a transponder carried on the customer's automobile.

9. The method of claim 1, where retrieving the archived information includes requesting the archived information from a database system.

10. The method of claim 1, where retrieving the archived information includes retrieving information collected by the service establishment during one or more previous visits by the customer.

11. The method of claim 1, where retrieving the archived information includes retrieving information about the customer collected and shared by more than one service establishment.

12. The method of claim 1, where acquiring a signal from a device carried by the customer includes acquiring a signal from a transponder of a type that is meant to be carried in the customer's pocket.

13. The method of claim 1, where offering the product or service to the customer includes using an electronic terminal at the service establishment to generate a printed coupon.

14. A network of computer systems for use in providing services to customers of a group of service establishments, the network comprising:

(a) local computer systems that are located at the service establishments, each of which is configured to:

collect information identifying customers of the service establishment and information about previous transactions with those customers; and when a customer is visiting the service establishment:

receive information identifying that customer;

assess the quality-of-service received by the customer during the visit; and if the quality-of-service received by the customer during the visit is below a quality-of-service threshold, assist in delivering an offer to compensate the customer; and (b) a data-warehouse system configured to:

receive from each of the local computer systems the information about the products and services purchased by customers and the information identifying those customers; and when a customer is visiting one of the service establishments, receive from the service establishment the information identifying that customer and, in response, deliver to the service establishment information about the products or services previously purchased by that customer for use in delivering the offer to the customer.

15. A computer system for use by a service establishment in providing services to a customer, the system including an executable program that causes the computer to:

receive a signal acquired from a device carried by the customer during a visit to the service establishment;

receive information that allows identification of the customer;

use this information to identify the customer and to retrieve archived information about previous interactions with the customer;

analyze the archived information to identify a product or service of interest to the customer;

assess the quality-of-service received by the customer during the visit;

decide that the quality-of-service received by the customer during the visit was below a quality-of-service threshold; and before the customer leaves the service establishment, create an offer to deliver the product or service to the customer at a discount.

16. The system of claim 15, where, in assessing the quality-of-service received by the customer during the visit, the computer measures the amount of time taken to serve the customer and compares the measured amount to a threshold amount.

17. The system of claim 16, where the computer uses the archived information about previous interactions with the customer in calculating the threshold amount.

18. The system of claim 15, where, in assessing the quality-of-service received by the customer, the computer measures the amount of time that the customer waits in a service lane provided by the service establishment.

19. The system of claim 18, where, in measuring the amount of time that the customer waits in the service lane, the computer:

initiates a time-monitoring sequence upon receiving the signal acquired from the device carried by the customer; and ends the time-monitoring sequence when the customer reaches a checkpoint in the service lane.

20. The system of claim 18, where, in measuring the amount of time that the customer waits in the service lane, the computer:

receives a signal acquired from the device when the customer reaches a first checkpoint; and receives another signal acquired from the device when the customer reaches a second checkpoint.

21. The system of claim 18, where, in measuring the amount of time that the customer waits in a service lane, the computer measures the customer's waiting-time in a drive-thru service lane provided by the service establishment.

22. The system of claim 21, where, in receiving a signal acquired from a device carried by the customer, the computer receives a signal acquired from a transponder carried on the customer's automobile.

23. The system of claim 15, where the computer requests the archived information from a database system.

24. The system of claim 15, where, in retrieving the archived information, the computer retrieves information collected by the service establishment during one or more previous visits by the customer.

25. The system of claim 15, where, in retrieving the archived information, the computer retrieves information about the customer collected and shared by more than one service establishment.

* * * * *